United States Patent
Handa et al.

(10) Patent No.: US 11,441,650 B2
(45) Date of Patent: Sep. 13, 2022

(54) ROTATION TRANSMISSION MECHANISM PROVIDED WITH STRAIN WAVE GEARING

(71) Applicant: HARMONIC DRIVE SYSTEMS INC., Tokyo (JP)

(72) Inventors: Jun Handa, Azumino (JP); Hiroaki Kimura, Azumino (JP); Sotaro Miyake, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 94 days.

(21) Appl. No.: 17/076,194

(22) Filed: Oct. 21, 2020

(65) Prior Publication Data
US 2021/0033177 A1 Feb. 4, 2021

Related U.S. Application Data

(62) Division of application No. 15/738,172, filed as application No. PCT/JP2015/069569 on Jul. 7, 2015, now Pat. No. 11,002,349.

(51) Int. Cl.
*F16H 1/32* (2006.01)
*F16H 35/10* (2006.01)
*F16H 49/00* (2006.01)

(52) U.S. Cl.
CPC .......... *F16H 35/10* (2013.01); *F16H 49/001* (2013.01); *F16H 2049/003* (2013.01)

(58) Field of Classification Search
CPC .............................. F16H 35/10; F16H 49/001
USPC .......................................................... 74/640
See application file for complete search history.

(56) References Cited

U.S. PATENT DOCUMENTS

| 6,564,677 | B1 | 5/2003 | Kiyosawa et al. |
| 9,476,354 | B2 | 10/2016 | Hiyoshi |
| 9,733,137 | B2 | 8/2017 | Urata |
| 2007/0281824 | A1 | 12/2007 | Tezuka et al. |

(Continued)

FOREIGN PATENT DOCUMENTS

| JP | H0777249 A | 3/1995 |
| JP | H11118003 A | 4/1999 |

(Continued)

OTHER PUBLICATIONS

Office Action issued in corresponding U.S. Appl. No. 15/738,172, dated Nov. 13, 2020 (9 pages).

(Continued)

*Primary Examiner* — William C Joyce
(74) *Attorney, Agent, or Firm* — Buchanan Ingersoll & Rooney PC

(57) ABSTRACT

In a rotation transmission mechanism that transmits the rotational driving force of a motor to a load-side member via a speed reducer, a strain wave gearing is used as the speed reducer, and the allowable load torque of members in the powertrain other than the strain wave gearing is greater than a predetermined upper-limit load torque. The allowable load torque of the strain wave gearing is dictated by the ratcheting torque, which is set so as not to exceed the upper-limit load torque. In an overload state, ratcheting is generated in the strain wave gearing, so that the strain wave gearing functions as a mechanical fuse. Other power transmission members can be protected from an overload state without adding a separate member such as a torque limiter.

1 Claim, 5 Drawing Sheets

(56) References Cited

U.S. PATENT DOCUMENTS

2015/0316428 A1 11/2015 Urata
2018/0180146 A1 6/2018 Handa et al.

FOREIGN PATENT DOCUMENTS

| JP | 2007321879 A | 12/2007 |
|---|---|---|
| JP | 2009156462 A | 7/2009 |
| JP | 2009222168 A | 10/2009 |
| JP | 2011144916 A | 7/2011 |
| JP | 2011-169152 | 9/2011 |
| JP | 2015055310 A | 3/2015 |
| WO | WO 2010/142318 | * 12/2010 |
| WO | 2014098218 A1 | 6/2014 |
| WO | 2014109179 | 1/2017 |

OTHER PUBLICATIONS

International Search Report (PCT/ISA/210) dated Oct. 6, 2015, by the Japanese Patent Office as the International Searching Authority for International Application No. PCT/JP2015/069569.
Written Opinion (PCT/ISA/237) dated Oct. 6, 2015, by the Japanese Patent Office as the International Searching Authority for International Application No. PCT/JP2015/069569.

* cited by examiner

ROTATION TRANSMISSION MECHANISM PROVIDED WITH STRAIN WAVE GEARING

CROSS-REFERENCE TO RELATED APPLICATION

The present application is a divisional of U.S. application Ser. No. 15/738,172, filed in the U.S. Patent & Trademark Office on Dec. 20, 2017. U.S. application Ser. No. 15/738,172 is a 371 of International Application No. PCT/JP2015/069569, which was filed on Jul. 7, 2015.

TECHNICAL FIELD

The present invention relates to a rotation transmission mechanism that transmits rotational driving force outputted from a rotation drive source to a load-side member via a speed reducer, and more specifically relates to a rotation transmission mechanism in which a strain wave gearing is incorporated as a speed reducer.

BACKGROUND ART

In a drive device that uses a speed reducer to reduce rotation outputted from a motor or another rotation drive source, and transmits the rotation to a load-side member, ensuring safety against overloading is an important objective. To prevent components constituting a powertrain of the drive device from being subjected to overload exceeding an allowable torque limit of the components, a component that slips when transmitted torque exceeds an upper limit, such as a torque limiter or the like, is added, and damage to the constituent components of the powertrain is prevented. Patent Document 1 proposes a drive device in which a torque limiter is inserted into the power transmission path through which the output rotation from the motor is transmitted.

A strain wave gearing that has no backlash and has high positioning precision is used as the speed reducer for reducing output rotation from the motor or other rotation drive source and transmitting the rotation to the load-side member. Patent Document 2 proposes a speed reducer unit that uses a strain wave gearing as a speed reducer. As described in Patent Documents 3 and 4, cup-shaped strain wave gearings provided with a cup-shaped externally toothed gear, top-hat-shaped strain wave gearings provided with a top-hat-shaped externally toothed gear, and flat strain wave gearings provided with a cylindrical externally toothed gear are known as typical strain wave gearings.

PRIOR ART LITERATURE

Patent Documents

Patent Document 1: JP-A 2015-55310
Patent Document 2: JP-A 2007-321879
Patent Document 3: JP-A 2011-144916
Patent Document 4: JP-A 2009-156462

SUMMARY OF THE INVENTION

Problems to be Solved by the Invention

In a prior-art rotation transmission mechanism, a torque limiter and other components are disposed, and damage to other rotational force transmitting components is prevented. Adding a torque limiter and other components is believed to lead to, inter alia, increases in the mass of the rotation transmission system, assembly errors, and dimensions.

An object of the present invention is to provide a rotation transmission mechanism that, using a speed reducer, can prevent the constituent components in the powertrain other than the speed reducer from being damaged by overloading.

Means of Solving the Problems

In order to solve the problems described above, according to the present invention, there is provided a rotation transmission mechanism that transmits rotational driving force outputted from a rotation drive source to a load-side member via a speed reducer, the rotation transmission mechanism characterized by having a powertrain configured from a plurality of power-transmitting members including the speed reducer;

wherein the speed reducer is a strain wave gearing;

an allowable load torque of the power-transmitting members other than the strain wave gearing is greater than a predetermined upper-limit load torque;

an allowable load torque of the strain wave gearing is prescribed by a ratcheting torque set to a value equal to or lower than the upper-limit load torque; and the strain wave gearing functions as a mechanical fuse.

In the present invention, attention is focused on the fact that ratcheting (tooth skipping) during overloading occurs in one failure mode of the strain wave gearing, and the invention is configured so that the strain wave gearing is first caused to undergo ratcheting during overloading. After ratcheting, the strain wave gearing can no longer be used, but damage to the other components constituting the powertrain by overloading can be prevented by causing the strain wave gearing to function as a "mechanical fuse."

A strain wave gearing is typically provided with a rigid internally toothed gear, a flexible externally toothed gear disposed on the inner side of the internally toothed gear, and an ellipsoidally contoured wave generator fitted to the inner side of the flexible externally toothed gear. The externally toothed gear is made to flex into an ellipsoidal shape by the wave generator, and the externally toothed gear partially meshes with the internally toothed gear. The wave generator is rotatably driven by, e.g., a motor, and when the wave generator rotates, the meshing positions of the gears move in the circumferential direction, and relative rotation occurs between the gears in accordance with the difference in the number of teeth between the gears (normally, the difference in the number of teeth is 2).

The externally toothed gear, made to flex in the radial direction, partially meshes with the internally toothed gear. In the strain wave gearing, the number of simultaneously meshing teeth between the gears is greater than in the case of a common speed reducer involving the meshing of rigid gears, e.g., in the case of meshing between an internally toothed gear and a planetary gear in a planetary gear speed reducer. Therefore, the meshing state of the gears can be adjusted, ratcheting torque between the gears can be made less than the allowable load torque of other power-transmitting members, and the strain wave gearing can be made to function as a mechanical fuse, without compromising the function of the strain wave gearing.

For example, in the teeth of one or both of the rigid internally toothed gear and the flexible externally toothed gear in the strain wave gearing, the tooth depth of the teeth in one portion in the circumferential direction is set to a shorter tooth depth than a case in which the ratcheting torque of the strain wave gearing, which is greater than the upper-limit load torque, is obtained. It is thereby possible to cause ratcheting when the portions of shorter tooth depth in the gears mesh. Consequently, the strain wave gearing can be made to function as a mechanical fuse, and instances of overloading in the other components of the powertrain can be avoided, without compromising the function of the strain wave gearing as a whole.

Another option instead of this configuration is that the fastening force by which the rigid internally toothed gear in the strain wave gearing is fixed by being fastened to the fixed-side member of the strain wave gearing may be set to a lesser fastening force in one portion of the internally toothed gear in the circumferential direction than a case in which the ratcheting torque of the strain wave gearing, which is greater than the upper-limit load torque, is obtained. The meshing rigidity between the internally toothed gear and the externally toothed gear in this portion is thereby lower than the meshing rigidity in other portions. Consequently, ratcheting can be caused in this portion when the gears mesh, and it is possible to avoid instances of overloading in other components of the powertrain in which the strain wave gearing is made to function as a mechanical fuse, without compromising the function of the strain wave gearing as a whole.

Depending on the situation, in the teeth of one or both of the rigid internally toothed gear and the flexible externally toothed gear in the strain wave gearing, the tooth depth can be set to a shorter tooth depth than when a value greater than the upper-limit load torque is obtained as the ratcheting torque of the strain wave gearing.

The amount of radial flexure of the externally toothed gear, when the flexible externally toothed gear in the strain wave gearing is made to flex in the radial direction and mesh with the rigid internally toothed gear, can also, depending on the situation, be set to a smaller amount of flexure than when a value greater than the upper-limit load torque is obtained as the ratcheting torque of the strain wave gearing.

MODE FOR CARRYING OUT THE INVENTION

An embodiment of a rotation transmission mechanism to which the present invention is applied is described below with reference to the drawings.

Figure 1:
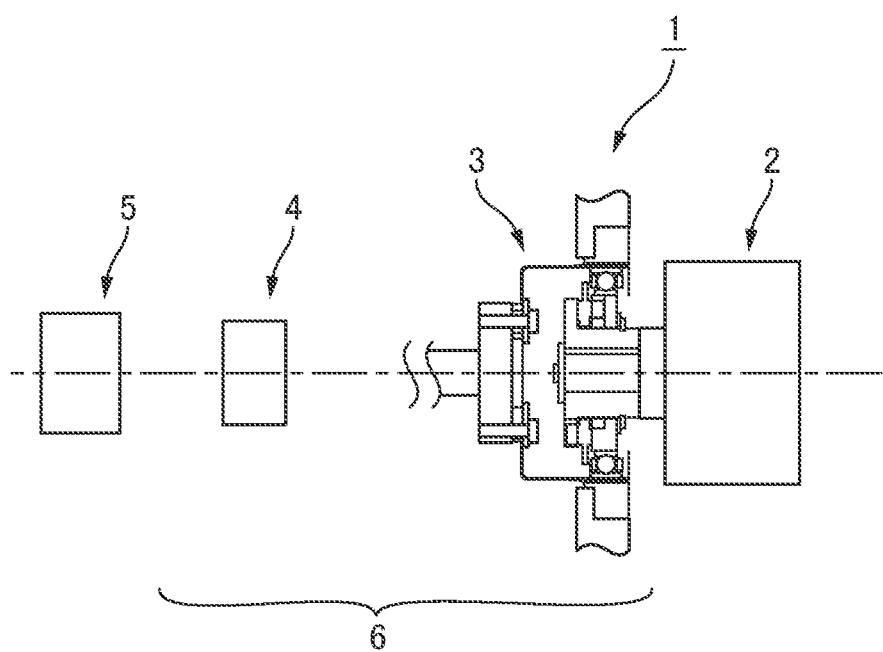
FIG. 1 is an explanatory drawing showing an example of a rotation transmission mechanism in which a cup-shaped strain wave gearing, to which the present invention is applied, is provided as a speed reducer.

FIG. 1 is an explanatory drawing showing a rotation transmission mechanism according to the embodiment. A rotation transmission mechanism 1 is provided with a motor 2 serving as a rotation drive source, a cup-shaped strain wave gearing 3 that reduces the speed of the rotation outputted by the motor 2, a coupling 4 that transmits reduced rotation outputted from the cup-shaped strain wave gearing 3, and a robot hand or another load-side member 5 driven by the reduced rotation transmitted via the coupling 4.

In this drawing, only the cup-shaped strain wave gearing 3 and the coupling 4 are shown as power-transmitting members constituting a powertrain 6, in order to simplify the description. In a common rotation transmission mechanism, a powertrain between the motor 2 and the load-side member 5 is configured from more components.

In the rotation transmission mechanism 1, the allowable load torque of power-transmitting components other than the cup-shaped strain wave gearing 3, e.g., the members on the side having the coupling 4 and the load-side member 5, is set to a value greater than a predetermined upper-limit load torque. To comply with this torque setting, the allowable load torque of the cup-shaped strain wave gearing 3 is stipulated by a ratcheting torque, which is set to be no greater than the upper-limit load torque.

FIG. 2 includes a schematic longitudinal cross-sectional view and a schematic front view showing the cup-shaped strain wave gearing 3. The cup-shaped strain wave gearing 3 is provided with a cylindrical device housing 11, an annular rigid internally toothed gear 12 coaxially fixed to the device housing 11, a cup-shaped externally toothed gear 13 coaxially disposed on the inner side of the internally toothed gear 12, and an ellipsoidally contoured wave generator 14 fitted to the inner side of the externally toothed gear 13. The wave generator 14 is linked to an output shaft 2a of the motor 2, and is rotatably driven by the motor 2.

The portion in the cup-shaped externally toothed gear 13 where external teeth 13a are formed is made to flex into an ellipsoidal shape by the wave generator 14, and the external teeth 13a positioned at both end portions of the major axis L of the externally toothed gear 13 mesh with internal teeth 12a of the internally toothed gear 12. When the wave generator 14 is rotated at high speed by the motor 2, relative rotation, which corresponds to the difference in the number of teeth between the gears 12 and 13, occurs between the gears. Because the internally toothed gear 12 is fixed to the device housing 11, which is a fixed-side member, the externally toothed gear 13 rotates, reduced rotation is outputted from an output shaft 13c coaxially linked to a boss 13b of the externally toothed gear 13, and the rotation is transmitted to the load-side member 5 (see FIG. 1) via the coupling 4.

Figure 3A:
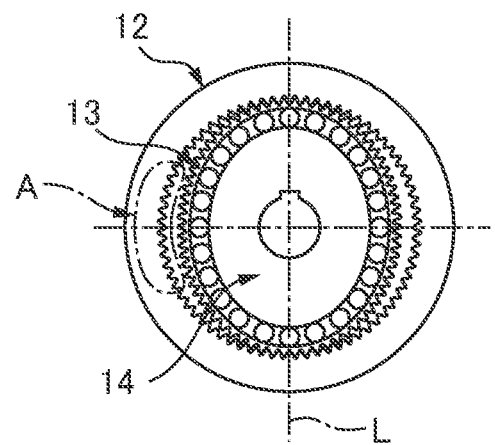
FIGS. 3(a) and 3(b) include explanatory drawings showing a case in which the tooth depth of the external teeth of the externally toothed gear has been shortened.

In this embodiment, of the external teeth 13a of the externally toothed gear 13 of the cup-shaped strain wave gearing 3, one portion in the circumferential direction, e.g., the plurality of external teeth 13a(2) positioned within the area enclosed by the single-dash line A in FIG. 3(a), has a tooth depth h1 shorter than that of the other external teeth 13a(1).

Figure 3B:
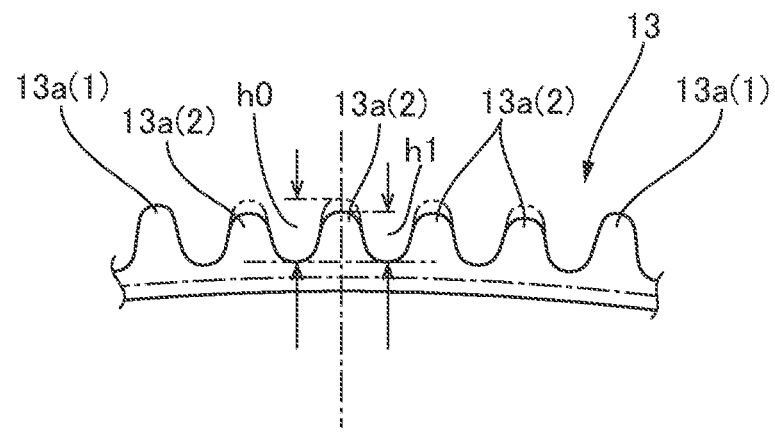

FIG. 3(b) is an explanatory drawing showing the external teeth 13a(1), which have the standard tooth depth, and the external teeth 13a(2), which have the short tooth depth h1. The tooth depth h1 of the external teeth 13a(2) is set to be shorter than the tooth depth h0, which is the tooth depth when the ratcheting torque of the cup-shaped strain wave gearing 3 is a value greater than the upper-limit load torque. For example, the tooth profile of the external teeth 13a(2) is a shifted tooth profile of the short tooth depth h1 obtained by causing a negative shift in the tooth profile of the external teeth 13a(1) having the tooth depth h0 shown by the imaginary line.

When an overload is exerted, ratcheting occurs in a state in which the portion of the external teeth 13a(2) having the short tooth depth h1 meshes with the internal teeth 12a, and overloading in the other power-transmitting members can be avoided. Specifically, in the strain wave gearing 3, the ratcheting torque can be kept to a value no greater than the upper-limit load torque while the function of the gearing as a speed reducer is maintained. The strain wave gearing 3 is the weakest part of the powertrain, and during overloading, ratcheting first occurs in the strain wave gearing 3 and damage occurs therein, whereby avoiding situations in which the other components are damaged by overloading.

In this embodiment, the tooth depth of the internal teeth 12a may be set to a short tooth profile in one portion in the circumferential direction, instead of the tooth depth of the external teeth 13a. It is also possible to make the external teeth and internal teeth in one portion in the circumferential direction have short tooth depths in both the external teeth 13a and the internal teeth 12a.

Next, the fastening force by which the internally toothed gear 12 in the strain wave gearing 3 is fixed by being fastened to the device housing 11, which is a fixed-side member of the strain wave gearing 3, may be reduced. Specifically, the fastening force can be set to a smaller value than when a value greater than the upper-limit load torque is obtained as the ratcheting torque of the strain wave gearing 3, the meshing rigidity of the gears can be reduced in the one portion in the circumferential direction of the gears, and the ratcheting torque can be lowered to be no greater than the upper-limit load torque.

Figure 2A:
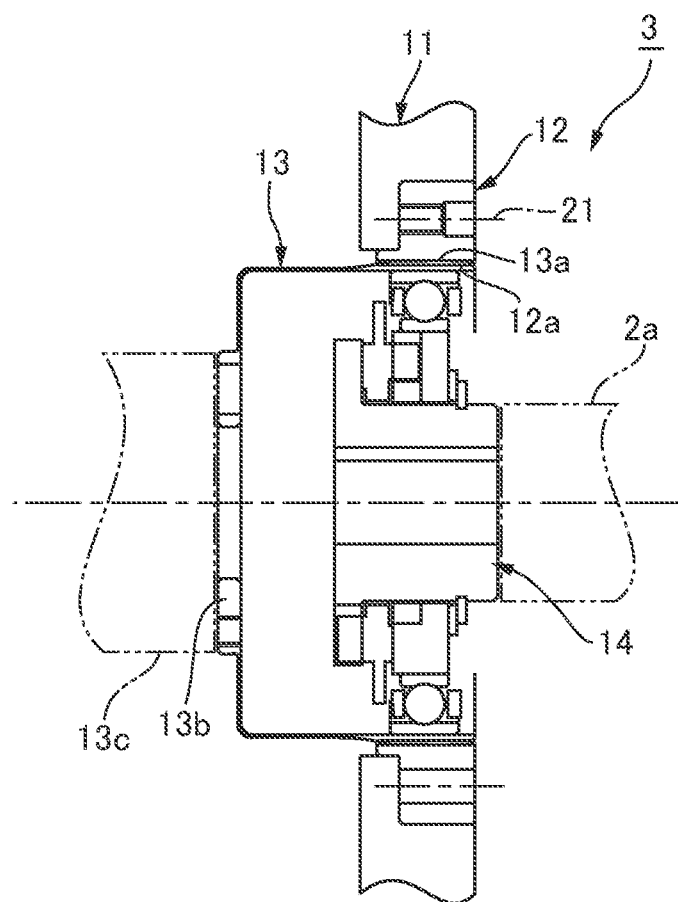
FIGS. 2(a) and 2(b) include a schematic longitudinal cross-sectional view and a schematic front view showing the cup-shaped strain wave gearing of FIG. 1.
Figure 2B:
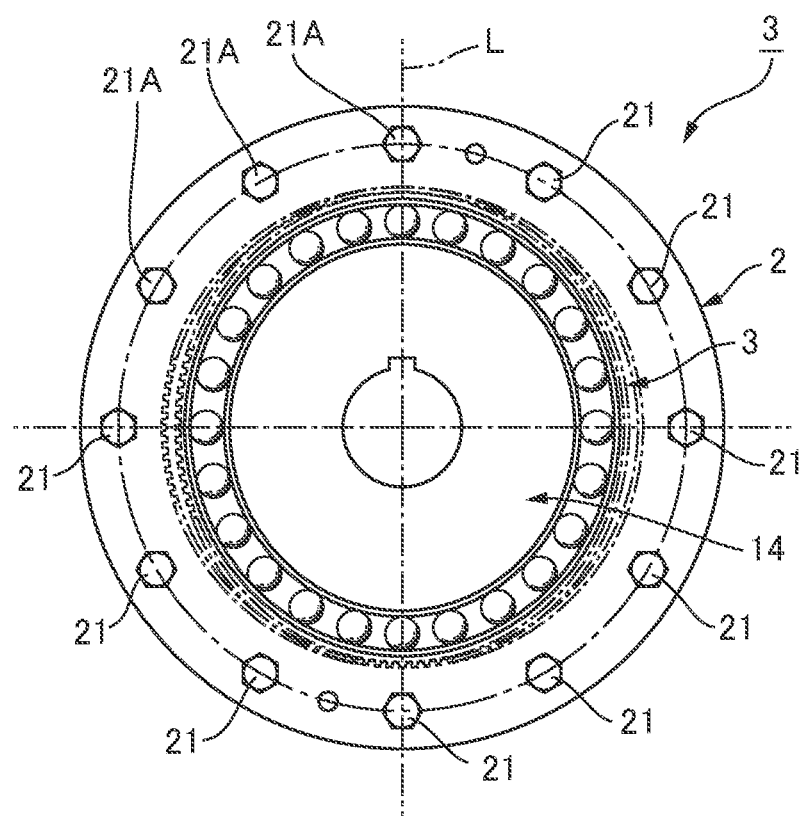

The internally toothed gear 12 is fixed by fastening to the device housing 11 by a plurality of fastening bolts 21 (shown by the single-dash line in FIG. 2(a)) at a prescribed pitch along the circumferential direction, as shown in, e.g., FIG. 2. The fastening bolts in one portion of the internally toothed gear 12 in the circumferential direction have a fastening force, derived from three fastening bolts 21A, less than the fastening force of the other fastening bolts 21, as shown in, e.g., FIG. 2(b).

As a result, meshing rigidity between the externally toothed gear 13 and the portion of the internally toothed gear 12 fastened by the fastening bolts 21A is lower than meshing rigidity between the externally toothed gear 13 and other portions of the internally toothed gear 12. Consequently, when the internal teeth of the portion fastened by the fastening bolts 21A mesh with the external teeth, the ratcheting torque can be kept to no greater than the upper-limit load torque.

Instead of partially reducing the fastening force, a portion of lower rigidity in the radial direction than other portions may be formed in one portion of the internally toothed gear 12 in the circumferential direction.

Figure 4:
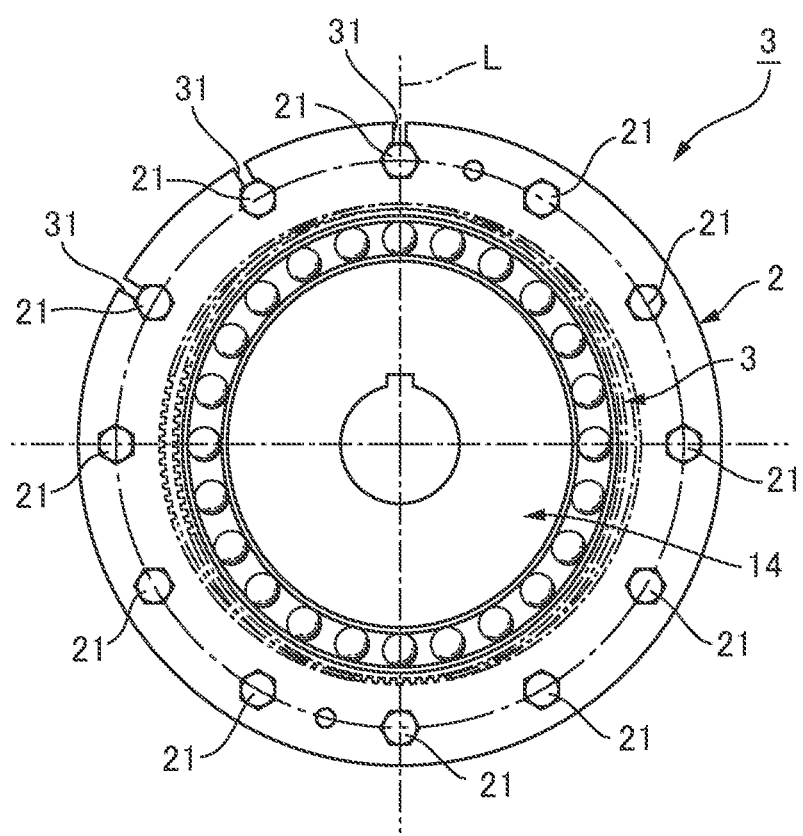
FIG. 4 is an explanatory drawing showing a case in which part of the internally toothed gear in the circumferential direction is a low-rigidity portion.

Slits 31, which extend outward in the radial direction from the bolt holes of the fastening bolts 21 to the external peripheral surface, can be provided to a portion of the internally toothed gear fastened by some of the fastening bolts 21 in the circumferential direction, as shown in, e.g., FIG. 4, and the rigidity in the radial direction can be made less than in other portions.

As described above, in the rotation transmission mechanism 1 of the present example, the strain wave gearing 3 is used as a speed reducer disposed in the powertrain of the rotation transmission mechanism 1, and this strain wave gearing 3 is the weakest part of the powertrain. It is thereby possible to use a strain wave gearing as a mechanical fuse, and to protect other constituent components of the powertrain so as to not be subjected to overloading, without adding a torque limiter or other members to the powertrain.

The strain wave gearing 3, unlike a planetary gear speed reducer or the like comprising intermeshed rigid gears, is provided with an elastically deforming gear, and many teeth of the gears simultaneously mesh together. Consequently, the strain wave gearing can be made to function as a mechanical fuse without compromising the function of the strain wave gearing.

OTHER EMBODIMENTS

The strain wave gearing 3 described above is a cup-shaped strain wave gearing, but a top-hat-shaped strain wave gearing, a flat strain wave gearing, and other strain wave gearing can also of course be used.

There are also cases in which it is possible, in the externally toothed gear 13 of the strain wave gearing 3 described above, to have the tooth depths of all the external teeth 13a be the short tooth depth h1.

There are also cases in which it is possible to reduce the amount of flexure of the externally toothed gear 13 in order to reduce the depth of meshing between the gears 12 and 13 and reduce ratcheting torque. After the pitch circle of the perfectly circular externally toothed gear 13 is made to flex into an ellipsoidal shape, the shape of the externally toothed gear 13 is referred to as an ellipsoidal pitch curve. In this case, the amount of flexure w of the externally toothed gear 13 is the difference between the pitch circle diameter C and the pitch curve diameter at the positions of the major axis L.

Figure 5:
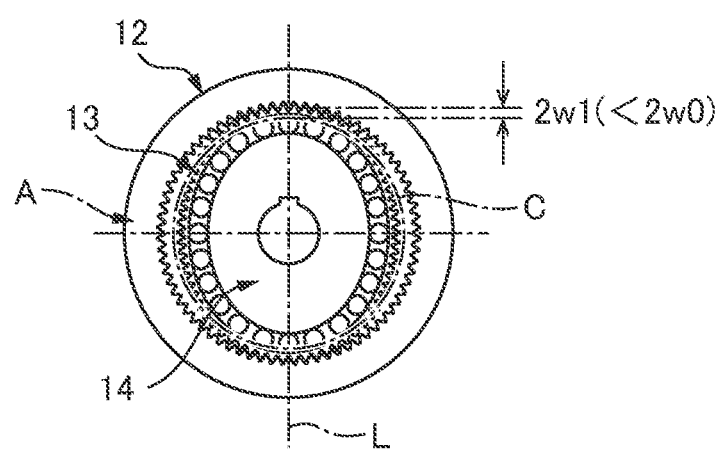
FIG. 5 is an explanatory drawing showing a case in which the amount of flexure of the externally toothed gear has been reduced.

The amount of flexure w1 of the externally toothed gear 13 in the radial direction, when the externally toothed gear 13 is made to flex in the radial direction and mesh with the internally toothed gear 12, may be set to a lesser amount than the amount of flexure w0 when a value greater than the upper-limit load torque is obtained for the ratcheting torque of the strain wave gearing 3, as shown in FIG. 5. It is thereby possible to set the ratcheting torque to a value no greater than the upper-limit load torque.

The invention claimed is:

1. A rotation transmission mechanism that transmits rotational driving force outputted from a rotation drive source to a load-side member via a speed reducer, the rotation transmission mechanism comprising:

a powertrain configured from a plurality of power-transmitting members including the speed reducer;

the speed reducer being a strain wave gearing;

an allowable load torque of the power-transmitting members other than the strain wave gearing being greater than a predetermined upper-limit load torque;

an allowable load torque of the strain wave gearing being prescribed by a ratcheting torque set to a value equal to or lower than the upper-limit load torque; and the strain wave gearing functioning as a mechanical fuse;

wherein a rigid internally toothed gear in the strain wave gearing is fixed and fastened to a fixed-side member of the strain wave gearing by means of a plurality of fastening bolts;

the fastening bolts are respectively inserted into bolt holes formed at a constant pitch in a circumferential direction of the rigid internally toothed gear; and slits, which extend outward in the radial direction from the bolt holes to an external peripheral surface of the rigid internally toothed gear, are provided to a portion of the internally toothed gear fastened by some of the fastening bolts in the circumferential direction and rigidity in a radial direction is made less than in other portions, so that a fastening force by which the rigid internally toothed gear is fixed by being fastened to the fixed-side member is set to a lesser fastening force in one portion of the internally toothed gear in a circumferential direction than a case in which the allowable load torque of the strain wave gearing is greater than the upper-limit load torque, whereby the ratcheting torque is set to be equal to or lower than the upper-limit load torque.

\* \* \* \* \*